(12) United States Patent
Han et al.

(10) Patent No.: US 7,030,546 B2
(45) Date of Patent: Apr. 18, 2006

(54) LIQUID CRYSTAL DISPLAY DEVICE HAVING AN ELECTROMAGNETIC-WAVE SHIELDING MEMBER

(75) Inventors: Byung-Woong Han, Incheon (KR); Jong-Dae Park, Seoul (KR); Jeong-Hwan Lee, Suwon-si (KR)

(73) Assignee: Samsung Electronics Co., Ltd., (KR)

( * ) Notice: Subject to any disclaimer, the term of this patent is extended or adjusted under 35 U.S.C. 154(b) by 35 days.

(21) Appl. No.: 10/629,086

(22) Filed: Jul. 28, 2003

(65) Prior Publication Data

US 2004/0114372 A1   Jun. 17, 2004

(30) Foreign Application Priority Data

Dec. 12, 2002   (KR) .................. 10-2002-0079141

(51) Int. Cl.
*H01J 29/80* (2006.01)
*H01J 1/52* (2006.01)
*F21V 5/00* (2006.01)

(52) U.S. Cl. .................. 313/402; 313/408; 315/85; 362/246; 362/248

(58) Field of Classification Search .............. 313/402, 313/407, 408, 238, 477–479; 315/56–58; 348/842, 819, 820, 836, 835, 833, 832
See application file for complete search history.

(56) References Cited

U.S. PATENT DOCUMENTS

| | | | |
|---|---|---|---|
| 5,333,073 A * | 7/1994 | Suzuki | 349/59 |
| 6,331,064 B1 * | 12/2001 | Nishiyama et al. | 362/260 |
| RE38,516 E * | 5/2004 | Hasegawa et al. | 349/58 |
| 2002/0041268 A1 * | 4/2002 | Yajima et al. | 345/102 |
| 2002/0126248 A1 * | 9/2002 | Yoshida | 349/149 |
| 2002/0153149 A1 * | 10/2002 | Okada et al. | 174/35 R |
| 2004/0074655 A1 * | 4/2004 | Takahashi et al. | 174/35 MS |

* cited by examiner

*Primary Examiner*—Tuyet Thi Vo
(74) *Attorney, Agent, or Firm*—Cantor Colburn LLP

(57) ABSTRACT

Disclosed is an LCD device including an electromagnetic wave shielding member for shielding the electromagnetic waves generated from electric power applied to lamp of backlight assembly. The shielding member comprising conductive material is coated on surface of a diffusing plate to have mesh shape. The shielding member is filled into groove formed on the surface of the diffusing plate to have mesh shape. Accordingly, the electromagnetic waves may be shielded from the LCD panel. Furthermore, the shielding member makes electrical contact with the chassis of the LCD device through various ground members so as to be connected to an earth potential, thereby being stabilized electrically. Accordingly, display quality of the LCD device is improved. A conductive tape is used as the ground member, and the conductive tape is strongly fixed to the chassis of the LCD device by means of conductive fixing clip or conductive screw.

30 Claims, 12 Drawing Sheets ial No.2002-79141 filed on Dec. 12, 2002, the contents of which are herein incorporated by reference in its entirety.

BACKGROUND OF THE INVENTION

1. Field of the Invention

The present invention relates to a backlight assembly for display devices and a liquid crystal display device having the same, and more particularly to a backlight assembly having an electromagnetic-wave shielding member for shielding an electromagnetic wave generated by a light source from an image display part of the liquid crystal display device and a liquid crystal display device having the same.

2. Description of the Related Art

Display devices have been developed together with information processing devices. The display device is an interfacing device between users and the information processing devices such that the users is able to identify the information processed by the information processing devices.

Among those display devices, a liquid crystal display (LCD) device is widely used since the LCD device can be manufactured to be lighter and thinner and can provide full-color and higher resolutions.

The LCD device displays information by using the optical properties of the liquid crystal molecules. Since the liquid crystal cannot emit a light by itself, the LCD device using the liquid crystal requires light so as to display an image. Accordingly, the LCD device usually employs additional light source. The LCD device usually displays an image using the light supplied from a backlight assembly. The backlight assembly is classified into a direct-illumination type and an edge-illumination type depending on the position of the light source such as a lamp. In the edge-illumination type backlight assembly, the lamp(s) is (are) disposed adjacent to at least one side face of a display panel for displaying an image, and the light exiting from the lamp is provided to the display panel through a light-guide plate. The light-guide plate changes the path of the light. The edge-illumination type backlight assembly has advantages of superior light uniformity, long endurance. The LCD device employing the edge-illumination type backlight assembly may have a thinner structure compared with the LCD device employing the direct-illumination type backlight assembly. For this reason, the edge-illumination type backlight assembly is usually installed in the LCD devices having a relatively small screen such as the LCD devices used in the laptop computers or desktop computers.

In the direct-illumination type backlight assembly, the lamp(s) is (are) disposed under the display panel, and the light exiting from the lamp does not pass through the light-guide plate and is directly incident into the display panel. That is, a plurality of the lamps parallel with one another is disposed under the display panel, and the light exiting from the lamps is irradiated onto an entire surface of the display panel, so that the direct-illumination type backlight assembly provides higher luminance compared with the edge-illumination type backlight assembly. For this reason, the direct-illumination type backlight assembly is usually installed in LCD devices having a relatively large screen.

However, the LCD devices have the following problems due to the backlight assembly.

The display panel usually includes a thin film transistor (TFT) substrate, a color filter substrate and a liquid crystal layer interposed between the TFT substrate and the color filter substrate. When an image signal is applied to the liquid crystal molecules, the arrangement of the liquid crystal molecules is changed, and the optical characteristics of the liquid crystal layer is changed. The liquid crystal display device displays the image using the changes of the transmissivity of the light passing through the liquid crystal layer.

The voltage level for driving the display panel is in a range from several volts to tens of volts since the voltage for driving the display panel is used only to change the arrangement of the liquid crystal molecules. However, the voltage level for driving the backlight assembly is in a range from several hundreds volts to several thousands volts since the voltage for driving the backlight assembly is used to turn on the lamp so as to generate the light. In particular, in case of the LCD device including the direct-illumination type backlight assembly, a plurality of lamps is simultaneously driven so that the voltage applied to the backlight assembly is hundreds or thousands times higher than the voltage applied to the display panel.

Since the intensity of an electric field is proportional to the voltage, the intensity of the electric field applied to the backlight assembly is hundred or thousands times higher than the intensity of the electric field applied to the display panel. Therefore, the electrical characteristics of the display panel into which the image signal is applied may be affected by the electromagnetic waves due to the high voltage signal applied to the lamp(s). When the image signal is disturbed, the correct image may not be displayed on the display panel. The electromagnetic waves may be generated by the electric field caused by the voltage applied to the lamp and by other electromagnetic changes during the discharge of the lamp. The electromagnetic waves due to the high voltage signal applied to the lamp cause electromagnetic disturbance in the liquid crystal display panel and change the electromagnetic characteristics of the display panel, so that the display failure may occur. Accordingly, the display quality of the LCD device may be deteriorated by the electromagnetic disturbance. In particular, the display quality debase is remarkably observed in the LCD device including the direct-illumination type backlight assembly since a plurality of lamps is disposed under the display panel.

SUMMARY OF THE INVENTION

Accordingly, the present invention is directed to a backlight assembly for display devices and a liquid crystal display device having the same that substantially obviate one or more problems due to limitations and disadvantages of the related art.

It is a first feature of the present invention to provide a backlight assembly for display devices, the backlight assembly capable of shielding the liquid crystal display panel from the electromagnetic waves.

It is a second feature of the present invention to provide an LCD device having the backlight assembly capable of shielding the liquid crystal display panel from the electromagnetic waves.

According to an aspect of the present invention for achieving the first feature of the present invention, there is provided a backlight assembly for a display device, the display device including an image display part on which an image is displayed. The backlight assembly comprises a light source for generating a first light, a light-distribution changing member for changing an optical distribution of the first light exiting from the light source, and an electromagnetic-wave shielding member for shielding an electromagnetic wave generated from an electric power applied to the light source from the image display part. The light-distribution changing member includes a diffuser and a plurality of optical sheet, the diffuser diffusing the first light exits from the light source, and the optical sheets are disposed over the diffuser and enhance a luminance of a second light exiting from the diffuser. The electromagnetic-wave shielding member includes a plurality of first shielding lines and a plurality of second shielding lines, the first shielding lines are formed along a first direction, and the second shielding lines are formed along a second direction crossing the first shielding line. The first (or second) shielding lines are formed in parallel with each other, each of the first (or second) shielding lines hass a first (or second) width, adjacent two first (or second) shielding lines are spaced apart from each other by a first (or second) distance, and a first (or second) ratio of the first (or second) width to the first (or second) distance is from about 1:7 to about 1:20. Each of the first shielding lines is perpendicular to each of the second shielding lines. The conductive material may be copper (Cu), chromium (Cr), molybdenum tungsten (MoW), chromium oxide ($CrO_x$), indium tin oxide (ITO) or indium zinc oxide (IZO). The electromagnetic-wave shielding member comprises a conductive material, and the electromagnetic-wave shielding member is inserted into a groove formed on a surface of the diffuser.

According to an aspect of the present invention for achieving the second feature of the present invention, there is provided a liquid crystal display device comprising a display panel, a backlight assembly and an electromagnetic-wave shielding member. The display panel receives an image signal to display an image corresponding to the image signal. The display panel includes a first substrate, a second substrate combined with the first substrate and a liquid crystal layer interposed between the first and second substrates. The backlight assembly includes a light source for generating a first light and a light-distribution changing member for changing an optical distribution of the first light exiting from the light source. The backlight assembly provides the display panel with the first light. The electromagnetic-wave shielding member shields an electromagnetic wave generated from an electric power applied to the light source to prevent the electromagnetic wave from affecting electromagnetically the image display part. The light-distribution changing member includes a diffuser and a plurality of optical sheet, the diffuser diffuses the first light exiting from the light source, and the optical sheets are disposed over the diffuser and enhance a luminance of a second light exiting from the diffuser. The electromagnetic-wave shielding member includes a plurality of first shielding lines and a plurality of second shielding lines, the first shielding lines are formed along a first direction, and the second shielding lines are formed along a second direction crossing the first shielding line. The first and second shielding lines have a mesh shape. The first (or second) shielding lines are formed in parallel with each other, each of the first (or second) shielding lines has a first (or second) width, adjacent two first (or second) shielding lines are spaced apart from each other by a first (or second) distance, and a first (or second) ratio of the first (or second) width to the first (or second) distance is from about 1:7 to about 1:20. Each of the first shielding lines is perpendicular to each of the second shielding lines. The liquid crystal display device further comprises a receiving container for receiving the display panel and the backlight assembly. The receiving container has a plurality of conductive sidewall, and the electromagnetic-wave shielding member electrically contacts with at least one of the conductive sidewalls to be connected an earth potential.

According to above exemplary embodiments, the electromagnetic-wave shielding member comprised of conductive material is formed between the light source and the display panel. Therefore, the electromagnetic disturbance due to the electromagnetic waves caused by the high voltage signal applied to the light source can be reduced.

In addition, the electromagnetic-wave shielding member comprising conductive material is formed in the backlight assembly. Therefore, the electromagnetic disturbance due to the electromagnetic waves caused by the high voltage signal applied to the light source can be reduced. Accordingly, the display quality of the LCD device can be improved.

Further, the electromagnetic-wave shielding member can be connected to an earth potential through a chassis of the LCD device, thereby electrically stabilizing the electromagnetic-wave shielding member.

BRIEF DESCRIPTION OF THE DRAWINGS

The above and other objects and advantages of the present invention will become readily apparent by reference to the following detailed description when considered in conjunction with the accompanying drawings, in which.

DETAILED DESCRIPTION OF THE INVENTION

The present invention now will be described more fully hereinafter with reference to the accompanying drawings, in which exemplary embodiments of the present invention are shown. This invention may, however, be embodied in many different forms and should not be construed as limited to the embodiments set forth herein.

Figure 1:
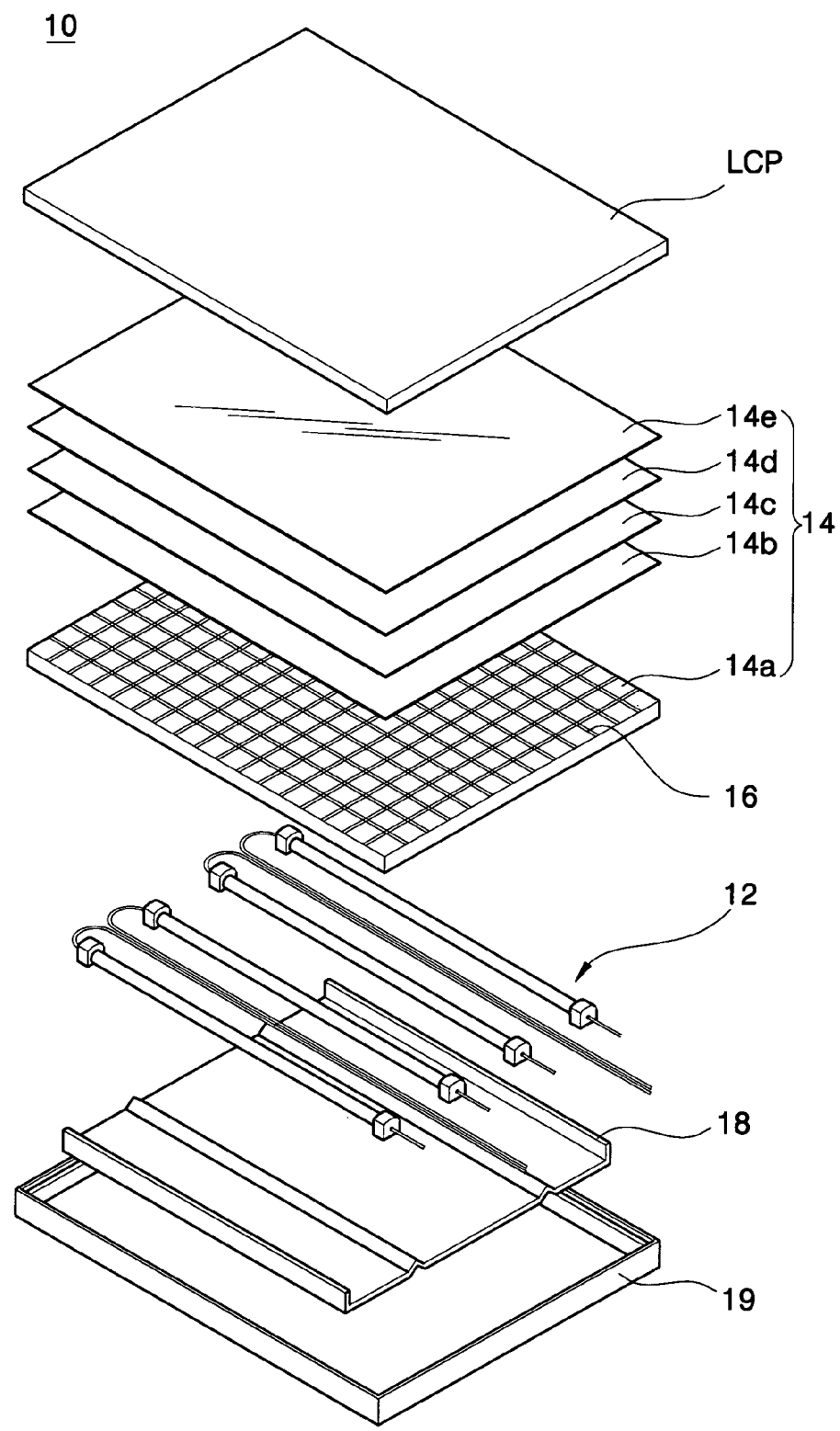
FIG. 1 is an exploded perspective view showing a backlight assembly including an electromagnetic-wave shielding member according to an exemplary embodiment of the present invention.

FIG. 1 is an exploded perspective view showing a backlight assembly including an electromagnetic-wave shielding member according to an exemplary embodiment of the present invention.

Referring to FIG. 1, the backlight assembly 10 according to an exemplary embodiment of the invention includes a light source 12 for generating light, a light-distribution changing member 14 for changing an optical distribution of the first light exiting from the light source 12, and an electromagnetic-wave shielding member 16 for shielding the electromagnetic waves due to the high voltage signal applied to the light source.

The light source 12 includes a plurality of lamps for emitting light, lamp holders disposed at both end portions of the lamp, and a pair of power line drawn out from the both end portions of the lamp. When an electricpower signal having a predetermined voltage is applied to the lamp through the power lines, light exits from the lamp. Electromagnetic waves are radiated in all directions due to the voltage signal applied to the lamp.

The light controller includes a diffusing plate (or diffuser) 14a and diffusing sheet 14b for diffusing the light exiting from the light source 12, a first prism sheet 14c and a second prism sheet 14d for concentrating the diffused light, and a protection sheet 14e for protecting the first and the second prism sheet 14c and 14d.

The diffusing plate 14a is formed as a rigid plate so as to support a plurality of optical sheet disposed over the light source 12 and firstly diffuses the light exiting from the light source 12 to provide the diffusing sheet with the diffused light. The diffusing sheet 14b is disposed over the diffusing plate 14a and secondly diffuse the light firstly diffused by the diffusing plate 14a.

The first prism sheet 14c and the second prism sheet 14d concentrate the light exiting from the diffusing sheet 14b and enhance the luminance of the light incident into a liquid crystal display panel (hereinafter, referred to as LCP) when the user views the LCP at the front of the LCP. The light exiting from the diffusing sheet 14b has a large viewing angle, or the light exiting from the diffusing sheet 14b exits from the diffusing sheet 14b in a large exiting angle with respect to the surface of the diffusing sheet 14b. Accordingly, the prism sheets 14c and 14d concentrates the light exiting from the diffusing sheet 14b such that the light exiting from the prism sheets 14c and 14d has a small viewing angle. Therefore, the luminance of the LCP is increased and power consumption is reduced. The protection sheet 14e is disposed over the second prism sheet 14d to prevent foreign matters from being attached to the second prism sheet 14d.

The electromagnetic-wave shielding member 16 may be formed on a front surface of the diffusing plate 14a, thereby preventing the electromagnetic waves from affecting the LCP. The electromagnetic-wave shielding member 16 has a first shielding line and a second shielding line crossing the first shielding line. Therefore, the electromagnetic-wave shielding member has a mesh structure. The first and second shielding lines comprise conductive material. For example, the conductive material may comprise copper (Cu), chromium (Cr), molybdenum tungsten (MoW), chromium oxide ($CrO_x$), indium tin oxide (ITO), or indium zinc oxide (IZO). The conductive material allows the electromagnetic waves having specific wavelengths to pass therethrough. Therefore, the electromagnetic waves (or noise signal) due to the high voltage signal applied to the lamp are shielded by the conductive material.

For example, the backlight assembly 10 further includes a receiving container 19 for receiving the light source 12, the light-distribution changing member 14 and the electromagnetic-wave shielding member 16. The receiving container 19 includes a bottom surface and a plurality of sidewalls extended from the edges of the bottom surface. The upper face of the receiving container 19 is opened, so that the receiving container 19 has a hexahedral shape. A receiving space is formed in the receiving container 19. The reflecting plate 18 is disposed in the receiving space along the bottom surface and the sidewalls of the receiving container 19. A plurality of the lamps parallel with each other is disposed over the reflecting plate 18. The light-distribution changing member 14 is disposed over the light source 12 to be spaced apart from the light source 12 by a predetermined distance.

When the lamp(s) is (are) disposed at one side or both sides of the LCP, the backlight assembly of the present invention may further include a light-guide plate for guiding the light exiting from the light source toward the light-distribution changing member. It is obvious that the electromagnetic-wave shielding member may be employed in the edge-illuminating type backlight assembly.

Figure 2:
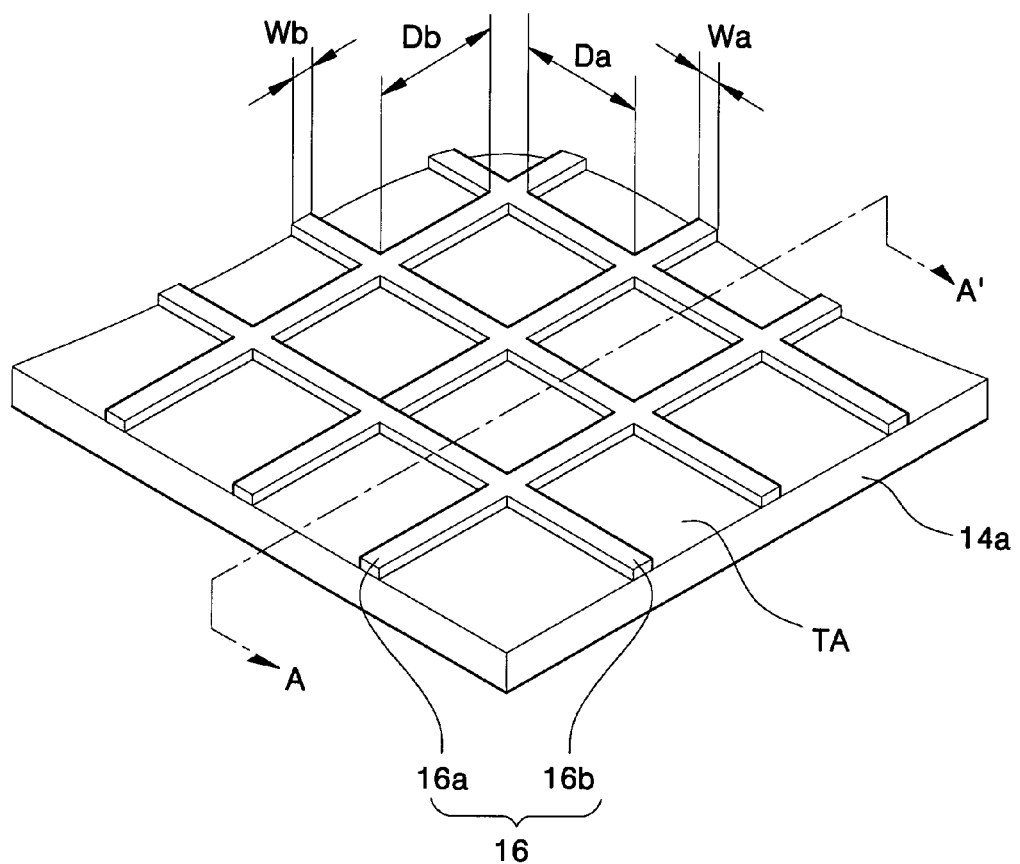
FIG. 2 is a perspective view showing an example of the diffuser on which the electromagnetic-wave shielding member is formed.
Figure 3A:
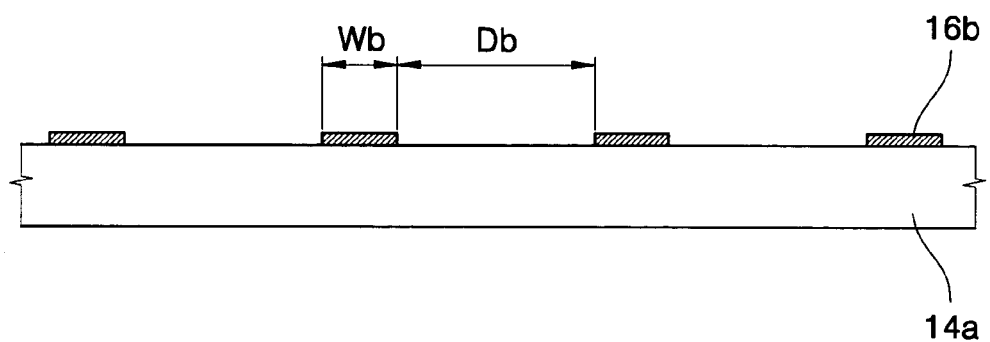
FIG. 3A is a cross sectional view taken along the line A—A of the diffuser of FIG. 2.
Figure 3B:
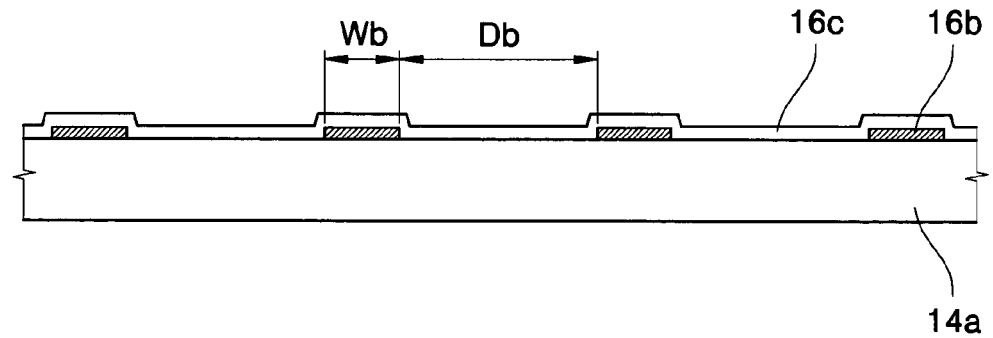
FIG. 3B is a cross sectional view showing a diffuser of FIG. 3A on which a shielding-line protection film is formed.

FIG. 2 is a perspective view showing an example of the diffuser on which the electromagnetic-wave shielding member is formed, FIG. 3A is a cross sectional view taken along the line A—A of the diffuser of FIG. 2, and FIG. 3B is a cross sectional view showing a diffuser of FIG. 3A on which a shielding-line protection film is formed.

Referring to FIG. 2 and FIG. 3A, the electromagnetic-wave shielding member 16 includes a plurality of first shielding line 16a coated on a surface of the diffusing plate 14a to be disposed in parallel with each other along a first direction, and a plurality of second shielding line 16b coated on the surface of the diffusing plate 14a to be disposed in parallel with each other along a second direction different from the first direction. The second shielding line 16b crosses the first shielding line 16a, so that the electromagnetic-wave shielding member 16 has a mesh structure.

The first shielding line 16a has a first width $W_a$ and a first vertical distance $D_a$. Adjacent two first shielding lines are spaced apart each other by the first vertical distance $D_a$. The second shielding line 16b has a second width $W_b$ and a second vertical distance $D_b$. Adjacent two second shielding lines is spaced apart each other by the second vertical distance $D_b$. The interval between the first shielding lines 16a is determined according to a ratio of the first width $W_a$ to the first vertical distance $D_a$, and the interval between the second shielding lines 16b is determined according to a ratio of the second width $W_b$ to the second vertical distance $D_b$. The electromagnetic waves (or noise signal) are shielded by the first and the second shielding lines 16a and 16b. The electromagnetic waves (or noise signal) pass through the diffusing plate 14a only through a transmitting area TA surrounded by the first and the second shielding lines 16a and 16b. The size of the transmitting area TA depends on the widths of the first and the second shielding lines 16a and 16b. The widths of the first and second shielding lines 16a and 16b are determined in consideration of the transmissivity of the electromagnetic waves passing through the first and the second shielding lines 16a and 16b. TThe ratio of the first width $W_a$ to the vertical distance $D_a$ may be in a range from about 1:7 to about 1:20. The interval of the first shielding lines 16a is about 7~20 times larger than the width of the first shielding line 16a. The ratio of the second width $W_b$ to the vertical distance $D_b$ may be also in a range from about 1:7 to about 1:20. Since the width of the first shielding line 16a is determined independent of the second shielding line 16b, the transmitting area TA of the electromagnetic-wave shielding member 16 may have various sizes. For example, the first and the second shielding lines may have the same width, the first shielding line 16a may perpendicularly crosses the second shielding line 16b, so that the transmitting area TA may have a rectangular shape. The first and the second vertical distances $D_a$ and $D_b$ may be more than several hundreds μm. A surface resistance of the electromagnetic-wave shielding member 16 may be equal to or less than 10 k$\Omega/m^2$.

The above described conductive material may be coated on the front surface of the diffusing plate 14a with a predetermined depth. The coated conductive material may be selectively etched away by using a photo mask (not shown), thereby forming the electromagnetic-wave shielding member that has mesh structure. In addition, the shielding-line protection film 16c may be further provided. The shielding-line protection film 16c may be coated on a front surface of the diffusing plate 14a on which the electromagnetic-wave shielding member 16 is formed with a predetermined depth as shown in FIG. 3B. The shielding-line protection film 16c prevents foreign matters from causing damaging on the electromagnetic-wave shielding member 16. The shielding-line protection film 16c may comprise transparent material such as a transparent organic film.

The density of the electromagnetic-wave shielding member 16 may be varied depending on the position on the surface of the diffusing plate 14a. In addition, the density of the electromagnetic-wave shielding member 16 may be varied depending on the intensity of the electromagnetic waves.

In general, the lamp of the light source includes a hot electrode to which a high voltage is applied and a cold electrode to which a relatively low voltage is applied. Therefore, the intensity of the electromagnetic waves is generated more strong at the hot electrode than at the cold electrode. For this reason, the density of the electromagnetic-wave shielding member 16 may be high at a portion of the diffusing plate 14a corresponding to the hot electrode of the lamp, and may be low at a portion of the diffusing plate 14a corresponding to the cold electrode of the lamp. For example, the electromagnetic-wave shielding member 16 may be formed only at the portion of the diffusing plate 14a corresponding to the hot electrode of the lamp. The nearer the electromagnetic-wave shielding member 16 is from the hot electrode, the thicker is the thickness of the first and second shielding lines 16a and 16b. Therefore, the nearer the electromagnetic-wave shielding member 16 is from the hot electrode, the higher is the density of the electromagnetic-wave shielding member 16.

Figure 4:
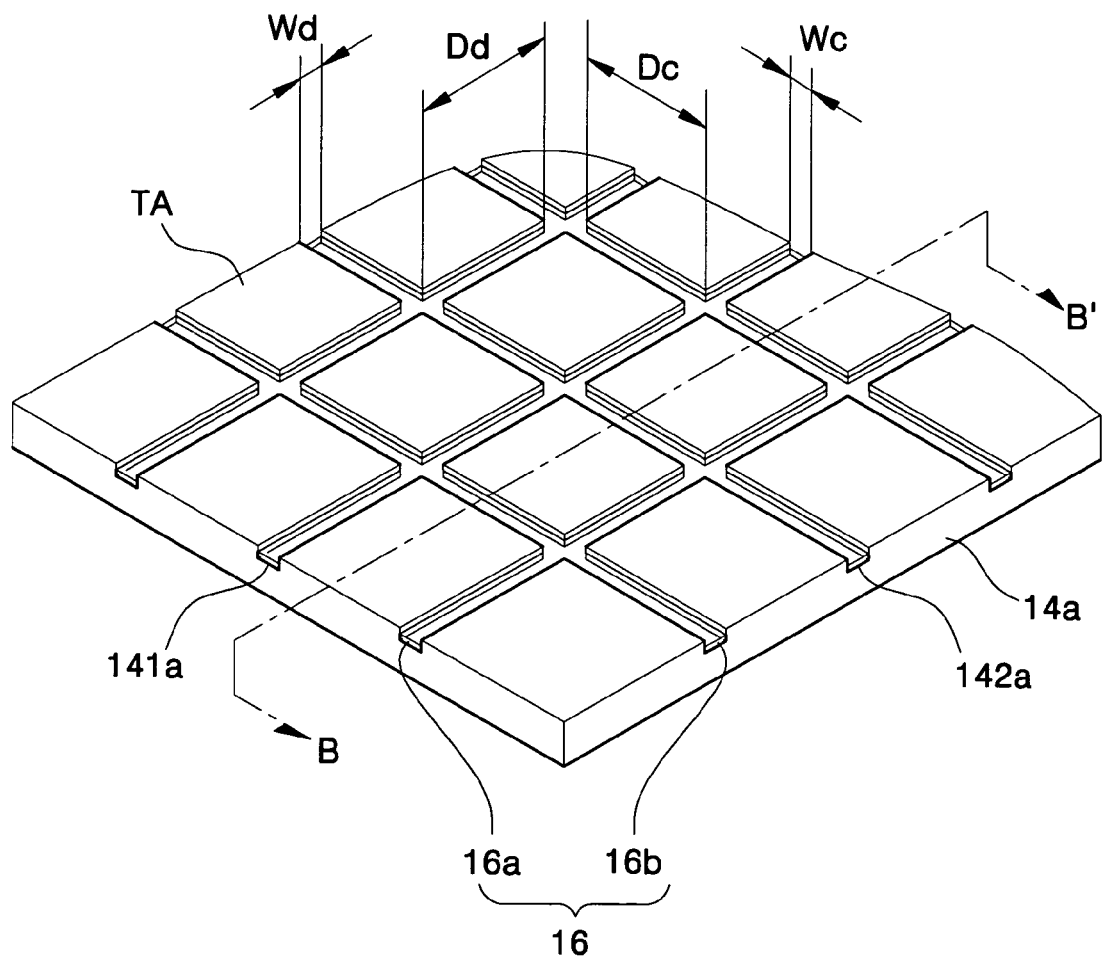
FIG. 4 is a perspective view showing another example of the diffuser on which the electromagnetic-wave shielding member is formed.
Figure 5A:
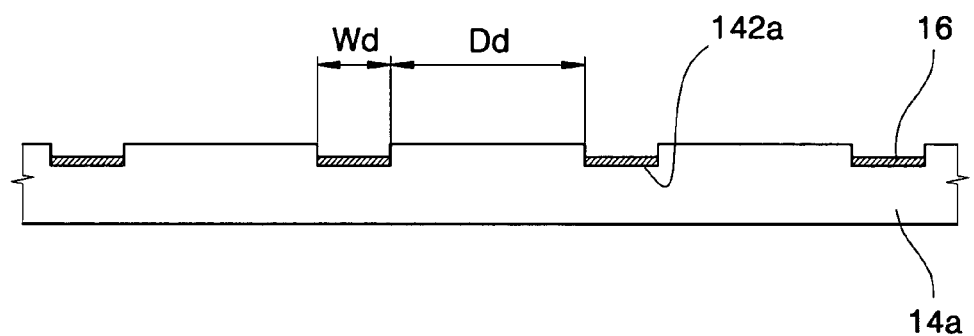
FIG. 5A is a cross sectional view showing a cross sectional view taken along the line B—B of the diffuser of FIG. 4.
Figure 5B:
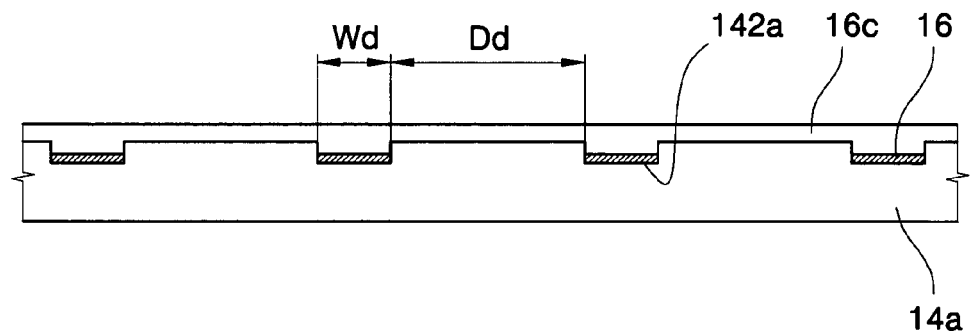
FIG. 5B is a cross sectional view showing the diffuser of FIG. 5A on which a shielding-line protection film is formed.

FIG. 4 is a perspective view showing another example of the diffuser on which the electromagnetic-wave shielding member is formed, FIG. 5A is a cross sectional view showing a cross sectional view taken along the line B—B of the diffuser of FIG. 4, and FIG. 5B is a cross sectional view showing the diffuser of FIG. 5A on which a shielding-line protection film is formed.

Referring to FIG. 4 and FIG. 5A, the electromagnetic-wave shielding member 16 includes a plurality of first shielding line 16a formed in parallel with each other along a first direction on a surface of the diffusing plate 14a, and a plurality of second shielding line 16b formed in parallel with each other along a second direction. The second direction is different from the first direction, and the second shielding line 16b crosses the first shielding line 16a, to thereby have a mesh structure. The plurality of first shielding line 16a comprises conductive material filled into a first groove 141a formed on the surface of the diffusing plate 14a. The first shielding line 16a has a third width $W_c$ and a third vertical distance $D_c$. In the same manner, the plurality of second shielding line 16b comprises conductive material filled into a second groove 142a formed on the surface of the diffusing plate 14a. The second shielding line 16b has a fourth width $W_d$ and a fourth vertical distance $D_d$. The ratio of the width to the vertical distance of each of the grooves 141a and 142a may be determined according to the transmissivity of the electromagnetic waves that passes through the diffusing plate 14a. For example, the ratio of the width to the vertical distance of each of the grooves 141a and 142a may be in a range from about 1:7 to about 1:20.

Although, above embodiment shown in FIGS. 4 and 5A shows that the thickness of the conductive material filled into the grooves 141a and 142a is smaller than the depth of the grooves 141a and 142a, the thickness of the conductive material filled into the grooves 141a and 142a could be equal to or larger than the depth of the grooves 141a and 142a, as would be known to one of the ordinary skill in the art.

In addition, as shown in FIG. 5B, the shielding-line protection film 16c may be further coated on the surface of the diffusing plate 14a on which the electromagnetic-wave shielding member 16 is formed with a predetermined depth. The shielding-line protection film 16c prevents foreign matters from damaging the electromagnetic-wave shielding member 16. The shielding-line protection film 16c may comprise a transparent material such as a transparent organic film.

Although above embodiment discusses the electromagnetic-wave shielding member formed on a front surface of the diffusing plate, the electromagnetic-wave shielding member could be formed on a rear surface of the diffusing plate so as to perform the same function, as would be known to one of the ordinary skill in the art. The rear surface of the diffusion plate faces the lamps. In addition, the electromagnetic-wave shielding member may comprise a plurality of conductive particles, and the conductive particles may be scattered onto a front surface or a rear surface of the diffusing plate to have the mesh shape.

The backlight assembly according to the present invention may be employed in a reflective and transmissive type display panel such as a reflective and transmissive type LCD device as well as a transmissive type display panel such as a transmissive type LCD device. In the transmissive type LCD device, one whole pixel functions as a transmissive region into which the light supplied from the backlight assembly disposed under the transmissive region. In the reflective and transmissive type LCD device, one pixel is divided into a reflective region, through which an image is displayed by using natural light such as sunlight, and a transmissive region, through which the image is displayed by using the light supplied from the backlight disposed under the transmissive region.

When an electric power signal is applied to the light source 12 so as to drive the backlight assembly 10, the electromagnetic waves are generated around the lamp proportional due to the voltage of the power signal. Then, the electromagnetic waves are absorbed at the conductive material of the electromagnetic-wave shielding member 16, to thereby be shielded from the LCP by the electromagnetic-wave shielding member 16. Accordingly, an electromagnetic effect on the LCP can be prevented, power consumption can be reduced, and the display quality of the LCP can be enhanced.

Figure 6:
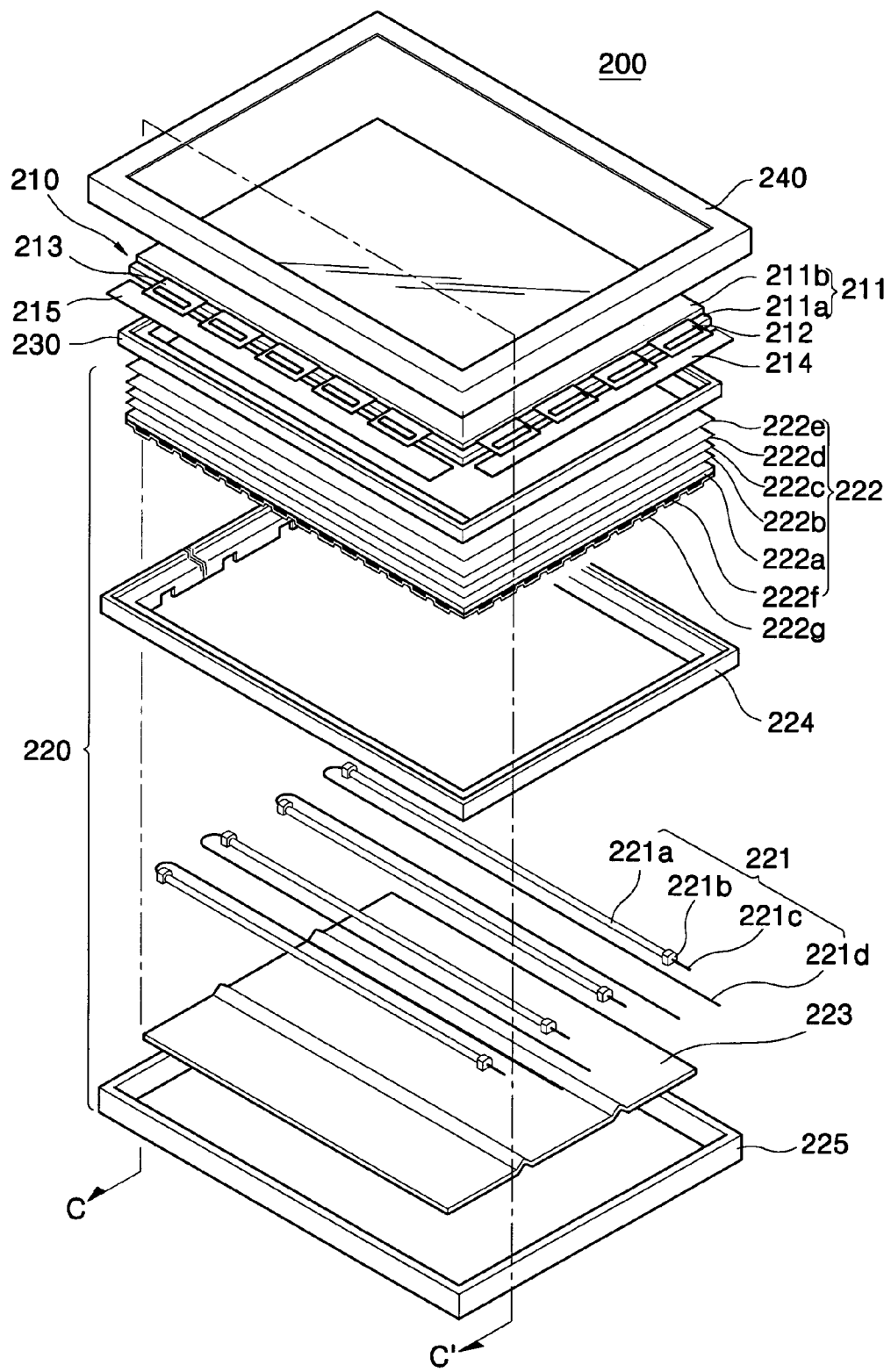
FIG. 6 is an exploded perspective view showing an LCD device including an electromagnetic-wave shielding member according to an exemplary embodiment of the present invention.
Figure 7:
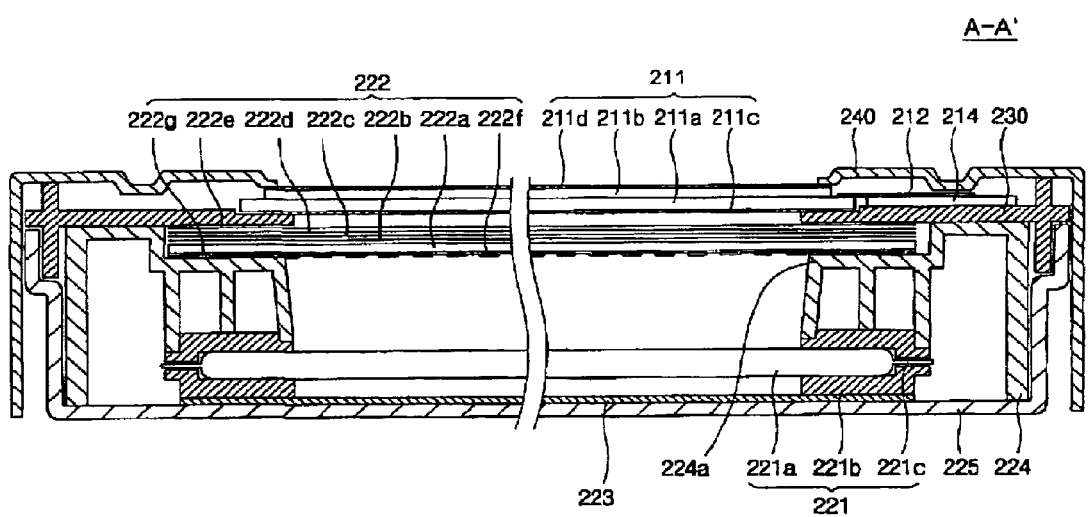
FIG. 7 is a cross sectional view taken along the line C—C of the LCD device of FIG. 6.

FIG. 6 is an exploded perspective view showing an LCD device including an electromagnetic-wave shielding member according to an exemplary embodiment of the present invention, and FIG. 7 is a cross sectional view taken along the line C—C of the LCD device of FIG. 6.

Referring to FIG. 6 and FIG. 7, an LCD device 200 according to an exemplary embodiment of the present invention includes a display panel assembly 210 for displaying an image, a backlight assembly 220 for providing the display panel assembly 210 with light, and a receiving member for receiving the display panel assembly 210 and the backlight assembly 220.

The display panel assembly 210 includes a liquid crystal display panel 211 for displaying an image according to an applied image signal, a data printed circuit board (PCB) 215, a gate PCB 214, a data tape carrier package (TCP) 213 and a gate tape carrier package (TCP) 212. The liquid crystal display panel 211 includes a TFT substrate 211a on which a plurality of thin film transistors (TFTs) is arranged, a color filter substrate 211b opposite to the TFT substrate 211a, and liquid crystal layer (not shown) interposed between the TFT substrate 211a and the color filter substrate 211b. A first polarizing plate 211c is installed under the TFT substrate 211a and enhances the luminance of the light incident into the liquid crystal display panel 211. A second polarizing plate 211d is installed over the color filter substrate 211b and enhances the luminance of the light exiting from the liquid crystal display panel 211.

The backlight assembly 220 includes a light source 221 for generating light, a light-distribution changing member 222 that is disposed over the light source 221 and controls the luminance of the light, a reflecting plate 223, a mold frame 224, and a bottom chassis 225. The reflecting plate 223 reflects the light that advances downward from the light source 221 to the reflecting plate 223 toward the display panel assembly 210.

The light source 221 includes a plurality of lamps 221a for generating light, lamp holders 221b disposed at both a first end portion of the lamp 221a and second end portion of the lamp 221a opposite to the first end portion, a first electrical line 221c drawn out from the first end portion of the lamp 221a, and a second electrical line 221d drawn out from the second end portion of the lamp 221a. An electric power signal having a predetermined voltage level is applied to the lamp 221a through the first and second electrical lines 221c and 221d, and light is generated from the lamp 221a. Electromagnetic waves are radiated in all directions due to the power signal applied to the lamp 221a.

One electrical line (221c or 221d) may be extended from one end portion of the lamp 221a to the other end portion of the lamp 221a from which the other electrical line (221d or 221c) is drawn out so as to connect the first and the second electrical lines 221c and 221d with a same power source (not shown). For example, as shown in FIG. 6, the second electrical line 221d may be extended from the first end portion of the lamp 221a to the second end portion of the lamp 221a from which the second electrical line 221c when a lower voltage is applied to the second electrical line 221d compared with the first electrical line 221c. The extended second electrical line 221d may be disposed under the reflecting plate 223. A receiving space for receiving the second electrical line 221d may be formed between the reflecting plate 223 and the bottom chassis 225.

The a light-distribution changing member 222 includes a diffusing plate 222a and diffusing sheet 222b for diffusing the light exiting from the light source 221, a first prism sheet 222c and a second prism sheet 222d for concentrating the diffused light, a protecting sheet 222e for protecting the first and the second prism sheet 221c and 221d, and an electromagnetic-wave shielding member 222f for shielding the electromagnetic waves from the display panel assembly 210.

The diffusing plate 222a has a rigid plate shape so as to support a plurality of optical sheets disposed over the light source 221. The diffusing plate 222a firstly diffuses the light exiting from the light source 221. The diffusing sheet 222b is disposed over the diffusing plate 222a and secondly diffuses the light exiting from the diffusing plate 222a.

The electromagnetic-wave shielding member 222f comprises a conductive material. The electromagnetic-wave shielding member 222f may be coated on a rear surface of the diffusing plate 222a and have a mesh shape. The electromagnetic-wave shielding member 222f includes a plurality of first shielding lines coated in parallel with each other on the rear surface of the diffusing plate 222a along a first direction, and a plurality of second shielding lines coated in parallel with each other along a second direction. The second direction is different from the first direction, and the second shielding line crosses the first shielding line. A ratio of a width to a vertical distance of each of the shielding lines may be is in a range from about 1:7 to about 1:20. The first shielding line and second shielding line may be perpendicular to each other along longitudinal and latitudinal directions of the diffusing plate 222a, respectively, and vice versa. The conductive material of the electromagnetic-wave shielding member 222f includes copper (Cu), chromium (Cr), molybdenum tungsten (MoW), chromium oxide ($CrO_x$), indium tin oxide (ITO), indium zinc oxide (IZO) or a combination thereof. A shielding-line protection film 222g may be coated on the entire rear surface of the diffusing plate 222a so as to prevent foreign matters from causing damage to the electromagnetic-wave shielding member 222f. The shielding-line protection film 222g may comprise a transparent material such as a transparent organic film.

Although, above embodiment shown in FIGS. 6 and 7 shows that the electromagnetic-wave shielding member is coated on a rear surface of the diffusing plate, the electromagnetic-wave shielding member could be coated on a front surface of the diffusing plate, as would be known to one of the ordinary skill in the art.

In addition, the electromagnetic-wave shielding member may be formed in a body with the diffusing plate by scattering conductive particles into onto the surface of the diffusing plate to have a mesh structure. Further, the electromagnetic-wave shielding member may be formed on the rear or the front surface of the diffusing sheet and may be formed in a body with the diffusing sheet by scattering the conductive materials on the surface of the diffusing sheet.

The first prism sheet 222c and the second prism sheet 222d concentrate the light exiting from the diffusing sheet 222b and enhance the luminance of light incident into the liquid crystal display panel 211. The light exiting from the diffusing sheet 222b has a large viewing angle, and the light passing through the prism sheets 222c and 222d has a narrow viewing angle. Therefore, when the user views the LCD panel in front of the LCD panel, the luminance is enhanced and power consumption is reduced. The protecting sheet 222e is disposed over the second prism sheet 222d so as to prevents various foreign matters from being attached to the second prism sheet 222d.

The receiving member includes bottom chassis 225 and mold frame 224 for receiving the backlight assembly 220, and a middle chassis 230 for receiving the display panel assembly 210.

The bottom chassis 225 may comprise a conductive material such as a metal. The bottom chassis 225 includes a bottom surface and a plurality of sidewall extended from an edge of the bottom surface. An upper face of the bottom chassis 225 is opened, so that the bottom chassis 225 have a hexahedral shape. A receiving space is formed in the bottom chassis 225. The mold frame 224 is received in the receiving space of the bottom chassis 225. The mold frame 224 includes a plurality of sidewalls and top and bottom face of the mold frame 224 are opened, to thereby have an opened hexahedron. An inner space is formed in the mold frame 224. A first stepped portion 224a is formed on the sidewall of the mold frame 224. The light source 221 and the reflecting plate 223 are received in the receiving space under the first stepped portion 224a. The light-distribution changing member 222 is supported by the upper surface of the stepped portion 224a and is received in the inner space. The middle chassis 230 is supported by the mold frame 224.

For example, the middle chassis 230 may has an opened hexahedron shape corresponding to the shape of the mold frame 224. The middle chassis 230 includes a second stepped portion 230a formed on the sidewall of the middle chassis 230. The middle chassis 230 prevents the a light-distribution changing member 222 from being detached from the bottom chassis 225. The liquid crystal display panel 211 is supported by the second stepped portion 230a. The liquid crystal display panel 211 is disposed over the light-distribution changing member 222.

The top chassis 240 may comprise a conductive material such as a metal and is combined with an outer peripheral portion of the bottom chassis 224, to thereby fix the display panel assembly 210 to the middle chassis 230.

When electric power signal having high voltage level is supplied to the light source 211a so as to drive the backlight assembly 220, light is generated from the lamp and is incident into the display panel assembly 210 via the a light-distribution changing member 222. The light incident into the LCD panel passes through the liquid crystal molecules of which alignment is regulated according to the electric field applied to the liquid crystal molecules so that various images are displayed on the display panel assembly. The electromagnetic waves generated from the power signal applied to the lamp are shielded by the electromagnetic-wave shielding member, to thereby prevent the electromagnetic waves from causing electromagnetical effect on the display panel assembly. Therefore, the display quality of the LCD can be enhanced and the power consumption can be reduced.

Although above embodiment shows that the electromagnetic-wave shielding member is installed in the direct-illumination type LCD device in which the light source is disposed under the display panel assembly, the electromagnetic-wave shielding member could also be installed in the edge-illumination type LCD device in which the light source is disposed at one side or both sides of the display panel assembly.

The electromagnetic-wave shielding member is electrically stabilized by ground member. The electromagnetic-wave shielding member absorbs the electromagnetic waves generated from the power signal applied to the lamp, and thus electrons are accumulated on the electromagnetic-wave shielding member. The electromagnetic-wave shielding member is connected to an earth potential, and the electrons accumulated on the electromagnetic-wave shielding member are discharged, thereby electrically stabilizing the electromagnetic-wave shielding member. The electromagnetic-wave shielding member may make electrical contact with the receiving member that is connected to the earth potential. The electromagnetic-wave shielding member may make direct contact with the receiving member and indirectly contacted with the receiving member through a ground member.

Figure 8:
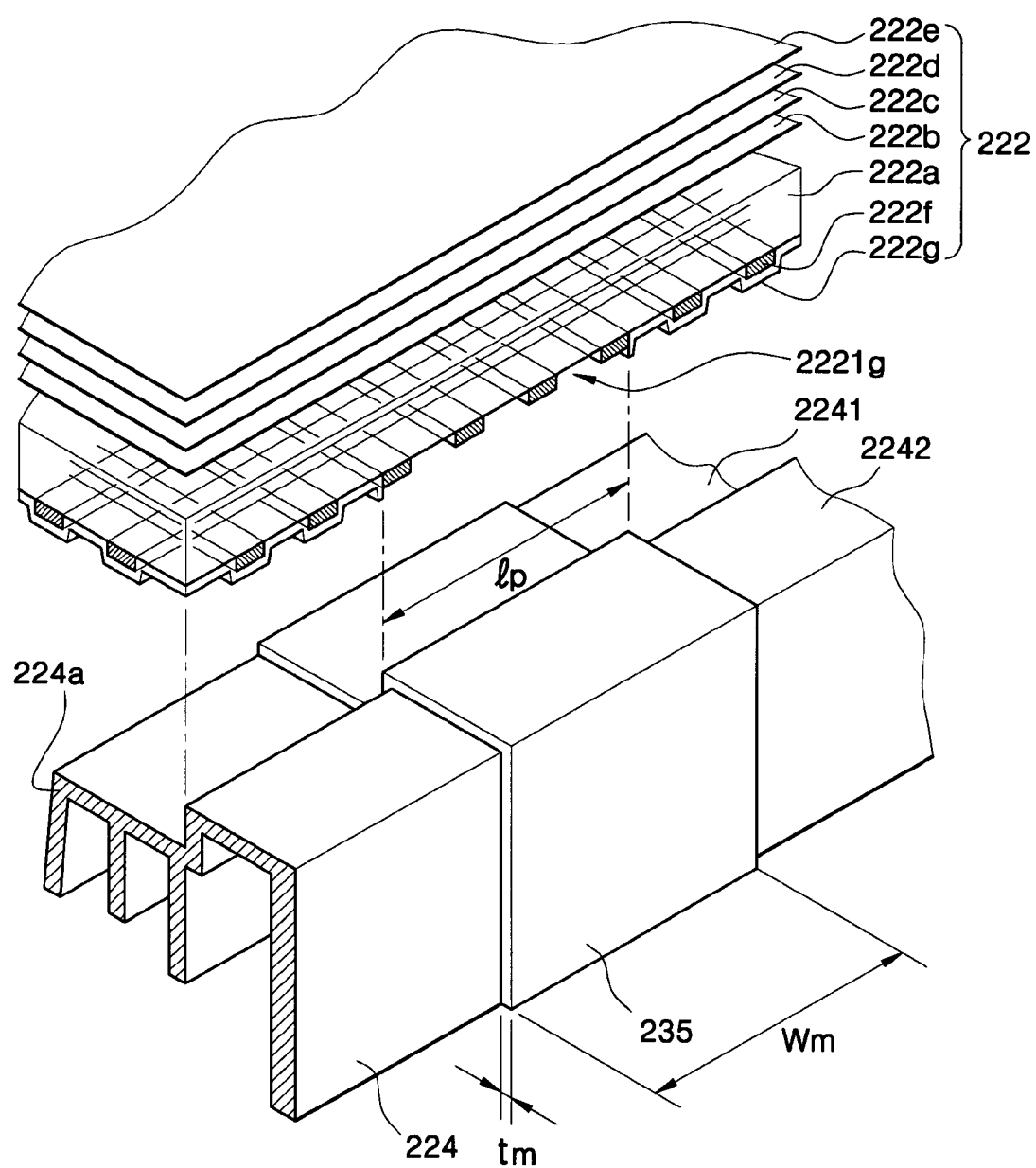
FIG. 8 is an exploded perspective view schematically showing the electromagnetic-wave shielding member and the ground member installed in the LCD device of FIG. 6.

FIG. 8 is an exploded perspective view schematically showing the electromagnetic-wave shielding member and the ground member installed in the LCD device of FIG. 6.

Referring to FIG. 8, the mold frame 224 having the stepped portion 224a includes a first upper surface 2241 for supporting the a light-distribution changing member 222 and a second upper surface 2242 for supporting the middle chassis 230. A conductive tape 235 having a a predetermined thickness $t_m$ and width $w_m$ is disposed along the first upper surface 2241 and the second upper surface 2242 so as to discharge electrons accumulated on the electromagnetic-wave shielding member. The conductive tape 235 may be bent downward at an outer edge of the second upper surface 2242 and extends along an outer sidewall of the mold frame 224 as shown in FIG. 8.

AThe shielding-line protection film 222g may include openings 2221g having a length $l_p$ corresponding to the width $w_m$ of the conductive tape 235. Therefore, when the a light-distribution changing member 222 is disposed on the first upper surface 2241 of the mold frame 224, the electromagnetic-wave shielding member 222f makes direct contact with the conductive tape 235 through the openings 2221g, to thereby form a discharge path through which the electrons accumulated on the electromagnetic-wave shielding member discharge. Accordingly, the electrons accumulated on the electromagnetic-wave shielding member 222f are discharged through the conductive tape 235.

Figure 9:
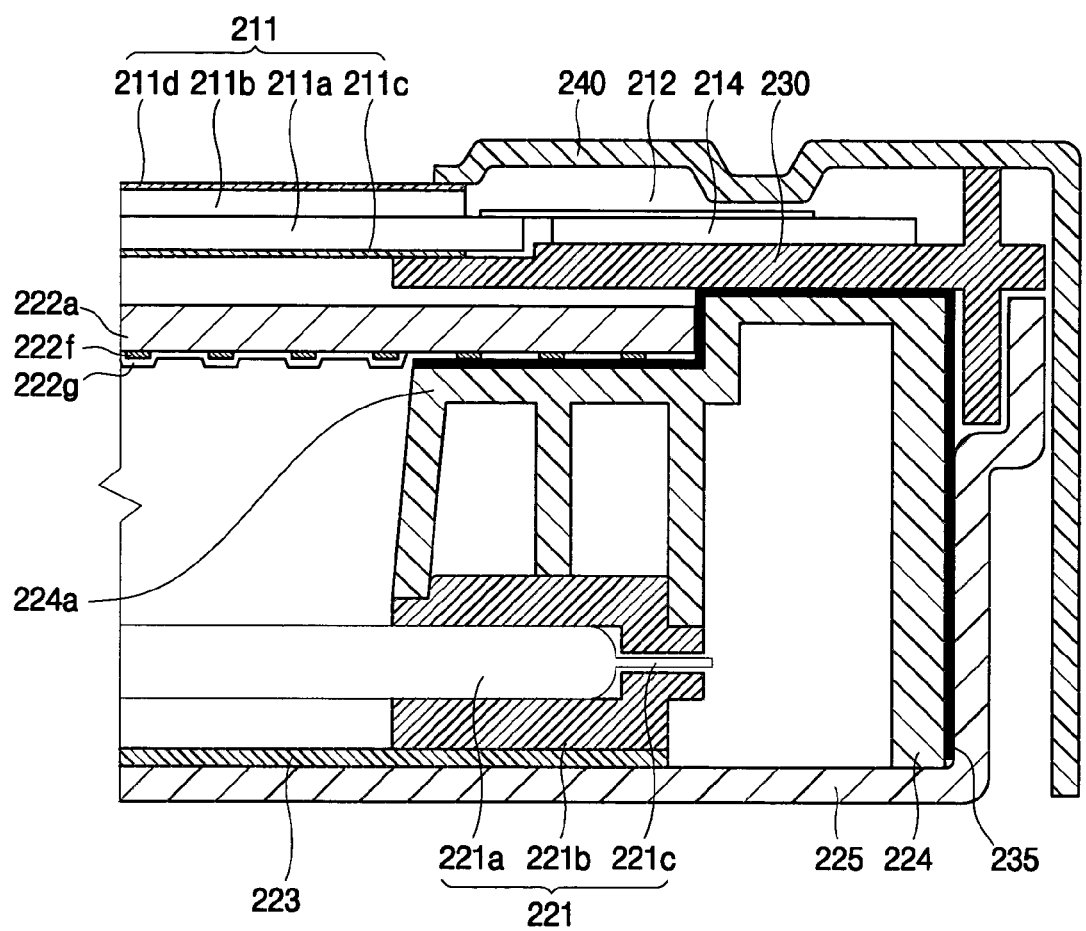
FIG. 9 is a cross sectional view showing a portion of the LCD device including the ground member of FIG. 8.

FIG. 9 is a cross sectional view showing a portion of the LCD device including the ground member of FIG. 8.

Referring to FIG. 9, a first portion of the conductive tape 235 disposed on the first upper surface 2241 of the mold frame 224 makes contact with the electromagnetic-wave shielding member 222f, a second portion of the conductive tape 235 disposed on the second upper surface of the mold frame 224 makes contact with a lower surface of the middle chassis 230. Then, the conductive tape 235 is bent downward and extends along the outer side surface of the mold frame 224, so that a third portion of the conductive tape 235 disposed on the outer side surface of the mold frame 224 makes contact with an inner sidewall of the bottom chassis 225. Therefore, the electrons accumulated on the electromagnetic-wave shielding member 222f can be discharged to the bottom chassis 225 through the conductive tape 235.

According to the above-described embodiment, the conductive tape 235 contacts with the lower surface of the middle chassis 230 to support the receiving member. However, when the LCD device does not have the middle chassis 230, the LCD device may have an additional fixing member for fixing the conductive tape 235 to the receiving member. For example, the fixing member may be a fixing clip or a screw.

Figure 10A:
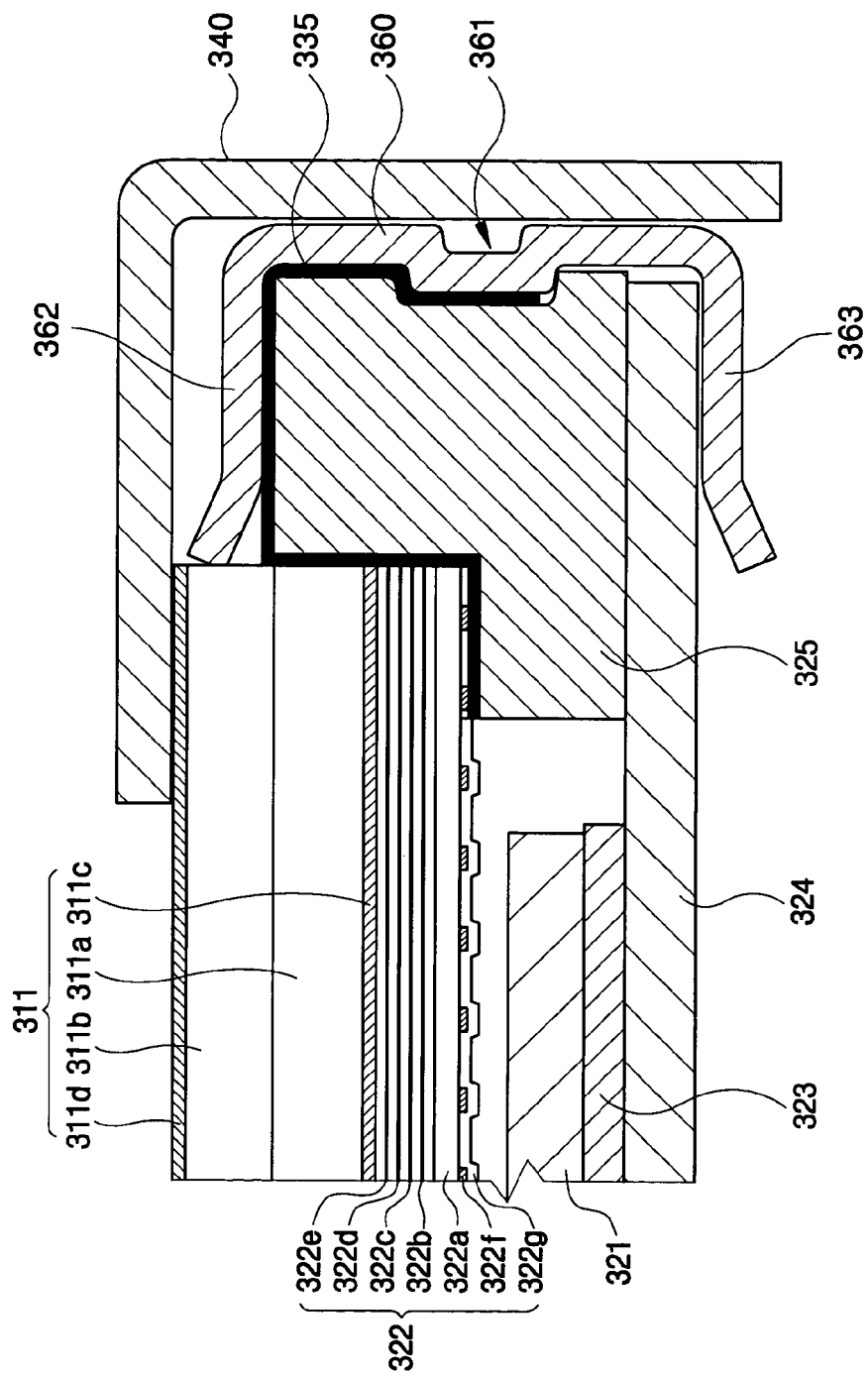
FIG. 10A is a cross sectional view showing a portion of the LCD device including ground member and a conductive fixing clip.
Figure 10B:
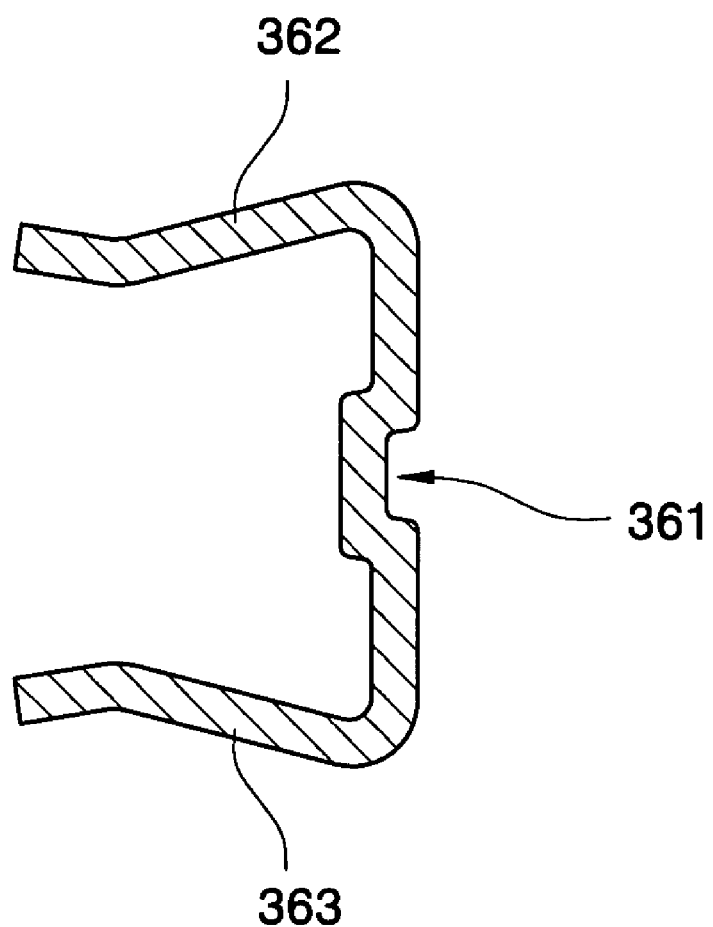
FIG. 10B is a cross sectional view showing an example of the fixing clip of FIG. 10A.
Figure 11:
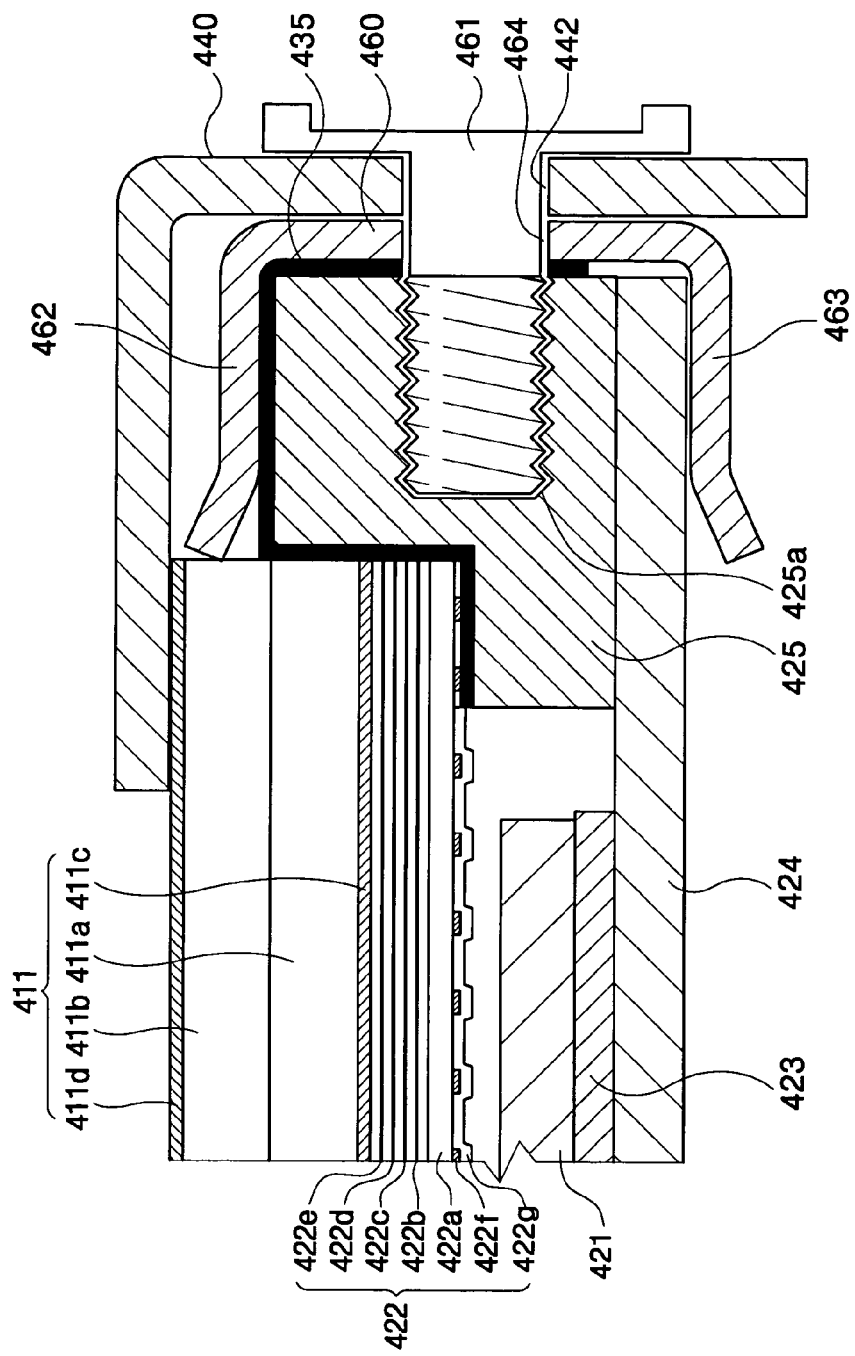
FIG. 11 is a cross sectional view showing a portion of the LCD device including the ground member, a conductive fixing clip and a conductive screw.

FIG. 10A is a cross sectional view showing a portion of the LCD device including ground member and a conductive fixing clip, FIG. 10B is a cross sectional view showing an example of the fixing clip of FIG. 10A, and FIG. 11 is a cross sectional view showing a portion of the LCD device including the ground member, a conductive fixing clip and a conductive screw.

According to the LCD device disclosed in FIG. 10 and FIG. 11, the stepped potion of the mold frame 325 supports the liquid crystal display panel and the a light-distribution changing member.

Referring to FIG. 10A, a mold frame 325 includes a plurality of sidewalls, and a receiving space is defined by the sidewalls. The receiving spaces sequentially receives a light source 321 for generating light, a light reflector 323 for reflecting the light exiting from the light source 321, a light-distribution changing member 322 for changing an optical distribution of the light exiting from the light source 321, and a liquid crystal display panel 311 for displaying an image.

The liquid crystal display panel 311 includes a TFT substrate 311a on which a plurality of TFTs is arranged in a matrix shape, a color filter substrate 311b opposite to the TFT substrate 311a, and liquid crystal layer (not shown) interposed between the TFT substrate 311a and the color filter substrate 311b. A first polarizing plate 311c is installed under the TFT substrate 311a so as to enhance the luminance of light incident into the liquid crystal display panel 311. A second polarizing plate 311d is installed on the color filter substrate 311b so as to enhance the luminance of the light exiting from the liquid crystal display panel 311.

The light-distribution changing member 322 includes a diffusing plate 322a and diffusing sheet 322b for diffusing the light exiting from the light source 321, a plurality of prism sheets 322c and 322d that is sequentially disposed over the diffusing sheet 322b and concentrates the diffused light, a protecting sheet 322e for protecting the plurality of sheet 322c and 322d.

An electromagnetic-wave shielding member 322f for shielding the electromagnetic waves from the liquid crystal display panel 311 may be coated on a rear surface of the diffusing plate 322a to have a mesh shape. Further, a shielding-line protection film 322g for protecting the electromagnetic-wave shielding member 322f may be coated on the rear surface of the diffusing plate 322a on which the electromagnetic-wave shielding member 322f is formed. The electromagnetic-wave shielding member 322f makes direct contact with a ground member comprised of a conductive material such as a conductive tape 335. The shielding-line protection film 322g has openings, the electromagnetic-wave shielding member 322f makes direct contact with the conductive tape 335 through the openings, to thereby form a discharge path through which the electrons accumulated on the electromagnetic-wave shielding member discharge. Accordingly, the electrons accumulated on the electromagnetic-wave shielding member 222f are discharged to the chassis through the conductive tape 335.

A fixing clip 360 is attached to the mold frame 325 so as to fix the conductive tape 335 to the mold frame 325. Since the fixing clip 360 comprises a material having high elasticity and conductivity, electrons can swiftly pass through the fixing clip 360 and the fixing clip 360 has an excellent restoring force against an external force. As shown in FIG. 10B, the fixing clip 360 includes first and second wings 362 and 363 for applying a fixing force to the conductive tape 335, and a groove 361 for applying a supplementary fixing force to the conductive tape 335.

The first and second wings 362 and 363 are widened by an external force, and then the first and second wings 362 and 363 make contact with an upper surface and a lower surface of the mold frame 325, respectively, so that the fixing clip 360 is attached to the mold frame 325. Therefore, the first and second wing 362 and 363 respectively apply restoring forces to the upper surface and the lower surface of the mold frame 325. Accordingly, the conductive tape 335 is stably fixed to the mold frame 325 and simultaneously makes contact with the conductive fixing clip 360.

A groove corresponding to the groove 361 of the fixing clip 360 may be formed on a side surface of the mold frame 325, and the conductive tape 335 may be inserted between the groove of the mold frame and the groove 361 of the fixing clip 360, so that the conductive tape 335 can be more strongly fixed to the mold frame 325 by the frictional forces between the groove of the mold frame and the groove 361 of the fixing clip 360.

When a top chassis 340 comprising a conductive material such as a metal is combined with the mold frame 325, inner surface of the sidewalls of the top chassis 340 makes contact with the fixing clip 360, so that the conductive tape 335 is also electrically connected to the top chassis 340 through the conductive fixing clip 360. Therefore, the electrons accumulated on the electromagnetic-wave shielding member 322f can be discharged not only to the mold frame 325 but also to the top chassis 340 through the conductive tape 335.

Referring to FIG. 11, a conductive tape 435 for connecting an electromagnetic-wave shielding member 422f to the earth potential may be more strongly fixed to a mold frame 425 by using a conductive fixing clip 460 and a screw 461. The screw 461 comprises a conductive material such as a metal, so that electrons can moves through the screw 461.

The screw 461 penetrates into a firs hole 442 formed in the top chassis 440 and a second hole formed in the fixing clip 460 and is engaged with a perforation hole 425a formed in the mold frame 425. Accordingly, the conductive tape 435 can be electrically connected to the top chassis 440 and a bottom chassis 424 through the conductive fixing clip 460 and the conductive screw 461.

Although the exemplary embodiments of the present invention have been described, it is understood that the present invention should not be limited to these preferred embodiments but various changes and modifications can be made by one skilled in the art within the spirit and scope of the present invention as hereinafter claimed.

What is claimed is:

1. A backlight assembly for a display device, the display device including an image display part on which an image is displayed, the backlight assembly comprising:
   a light source that generates a first light;
   a light-distribution changing member that changes an optical distribution of the first light exiting from the light source; and
   an electromagnetic-wave shielding member formed on the light-distribution changing member, the electromagnetic-wave shielding member shielding an electromagnetic wave generated from an electric power applied to the light source from the image display part.

2. The backlight assembly of claim 1, further comprising a receiving container that receives the light source, the light-distribution changing member and the electromagnetic-wave shielding member.

3. The backlight assembly of claim 1, wherein the light-distribution changing member includes a diffuser and a plurality of optical sheet, the diffuser diffusing the first light exiting from the light source, and the optical sheets being disposed over the diffuser and enhancing a luminance of a second light exiting from the diffuser.

4. The backlight assembly of claim 3, wherein the electromagnetic-wave shielding member comprises conductive material, and the electromagnetic-wave shielding member is inserted into a groove formed on a surface of the diffuser.

5. The backlight assembly of claim 3, wherein the light-distribution changing member further includes a complementary diffuser, disposed between the diffuser and the optical sheets, for diffusing the second light diffused by the diffuser.

6. The backlight assembly of claim 5, wherein the electromagnetic-wave shielding member comprises a conductive material, and the electromagnetic-wave shielding member is formed on a surface of the complementary diffuser.

7. The backlight assembly of claim 3, wherein the electromagnetic-wave shielding member comprises a conductive material, and the electromagnetic-wave shielding member is formed on a surface of the diffuser and has a mesh shape.

8. The backlight assembly of claim 7, wherein the conductive material is one selected front the group consisting of copper (Cu), chromium (Cr), molybdenum tungsten (MoW), chromium oxide ($CrO_x$) indium tin oxide (ITO) and indium zinc oxide (IZO).

9. The backlight assembly of claim 7, further comprising a protection film that protects the electromagnetic-wave shielding member.

10. The backlight assembly of claim 9, wherein the protection film comprises transparent organic material.

11. The backlight assembly of claim 7, wherein the electromagnetic-wave shielding member includes a plurality of first shielding lines and a plurality of second shielding lines, the first shielding lines being fanned along a first direction, and the second shielding lines being formed along a second direction crossing the first shielding line.

12. The backlight assembly of claim 11, wherein each of the first shielding lines is perpendicular to each of the second shielding lines.

13. The backlight assembly of claim 11, wherein the first shielding lines are formed in parallel with each other, each of the first shielding lines has a first width, adjacent two first shielding lines are spaced apart from each other by a first distance, and a first ratio of the first width to the first distance is from about 1:7 to about 1:20.

14. The backlight assembly of claim 13, wherein the second shielding lines are formed in parallel with each other, each of the second shielding lines has a second width, adjacent two second shielding lines are spaced apart from each other by a second distance, and a second ratio of the second width to the second distance is from about 1:7 to about 1:20.

15. A liquid crystal display device comprising:
a display panel that receives an image signal to display an image corresponding to the image signal, the display panel including a first substrate, a second substrate combined with the first substrate, and a liquid crystal layer interposed between the first and second substrates;
a backlight assembly including a light source that generates a first light and a light-distribution changing member that changes an optical distribution of the first light exiting from the light source, and the backlight assembly providing the display panel with the first light; and
an electromagnetic-wave shielding member formed on the light-distribution changing member, the electromagnetic-wave shielding member shielding an electromagnetic wave generated from an electric power applied to the light source, thereby preventing the electromagnetic wave from affecting electromagnetically the image display part.

16. The liquid crystal display device of claim 15, further comprising a receiving container that receives the display panel and the backlight assembly, wherein the backlight assembly has a plurality of conductive sidewall, and the electromagnetic-wave shielding member electrically contacts with at least one of the conductive sidewalls to be connected an earth potential.

17. The liquid crystal display device of claim 16, further comprising a connection member that electrically connects the electromagnetic-wave shielding member with the receiving container, the connection member comprising a conductive material.

18. The liquid crystal display device of claim 17, further comprising a fixing member that fixes the connection member to the receiving container, the fixing member comprising conductive material.

19. The liquid crystal display device of claim 15, wherein the light-distribution changing member includes a diffuser and a plurality of optical sheet, the diffuser diffusing the first light exiting from the light source, and the optical sheets being disposed over the diffuser and enhancing a luminance of a second light exiting from the diffuser.

20. The liquid crystal display device of claim 19, wherein the electromagnetic-wave shielding member comprises conductive material, and the electromagnetic-wave shielding member is inserted into a groove formed on a surface of the diffuser.

21. The liquid crystal display device of claim 19, wherein the light-distribution changing member further includes a complementary diffuser, disposed between the diffuser and the optical sheets, thereby diffusing the second light diffused by the diffuser.

22. The liquid crystal display device of claim 21, wherein the electromagnetic-wave shielding member comprises conductive material, and the electromagnetic-wave shielding member is formed on a surface of the complementary diffuser.

23. The liquid crystal display device of claim 19, wherein the electromagnetic-Wave shielding member comprises a conductive material, and the electromagnetic-wave shielding member is formed on a surface of the diffuser and has a mesh shape.

24. The liquid crystal display device of claim 23, wherein the conductive material is one selected from the group consisting of copper (Cu), chromium (Cr), molybdenum tungsten (MoW), chromium oxide ($CrO_x$), indium tin oxide (ITO) and indium zinc oxide (IZO).

25. The liquid crystal display device of claim 23, wherein the electromagnetic-wave shielding member includes a plurality of first shielding lines and a plurality of second shielding lines, the first shielding lines being formed along a first direction, and the second shielding lines being formed along a second direction crossing the first shielding line.

26. The liquid crystal display device of claim 25, wherein each of the first shielding lines is perpendicular to each of the second shielding lines.

27. The liquid crystal display device of claim 25, wherein each of the first shielding lines has a first width, adjacent two first shielding lines are spaced apart from each other by a first distance, and a first ratio of the first width to the first distance is from about 1:7 to about 1:20.

28. The liquid crystal display device of claim 27, wherein each of the second shielding lines has a second width, adjacent two second shielding lines are spaced apart from each other by a second distance, and a second ratio of the second width to the second distance is from about 1:7 to about 1:20.

29. A backlight assembly for a display device, the display device including an image display part on which an image is displayed, the backlight assembly comprising:

a light source that generates a first light;

a light-distribution changing member that changes an optical distribution of the first light exiting from the light source; and an electromagnetic-wave shielding member formed on the light-distribution changing member, the electromagnetic-wave shielding member shielding an electromagnetic wave generated from an electric power applied to the light source from the image display part.

30. The backlight assembly of claim 29, wherein the light-distribution changing member comprises a diffuser, and the electromagnetic-wave shielding member is patterned on the diffuser.

* * * * *